UNITED STATES PATENT OFFICE.

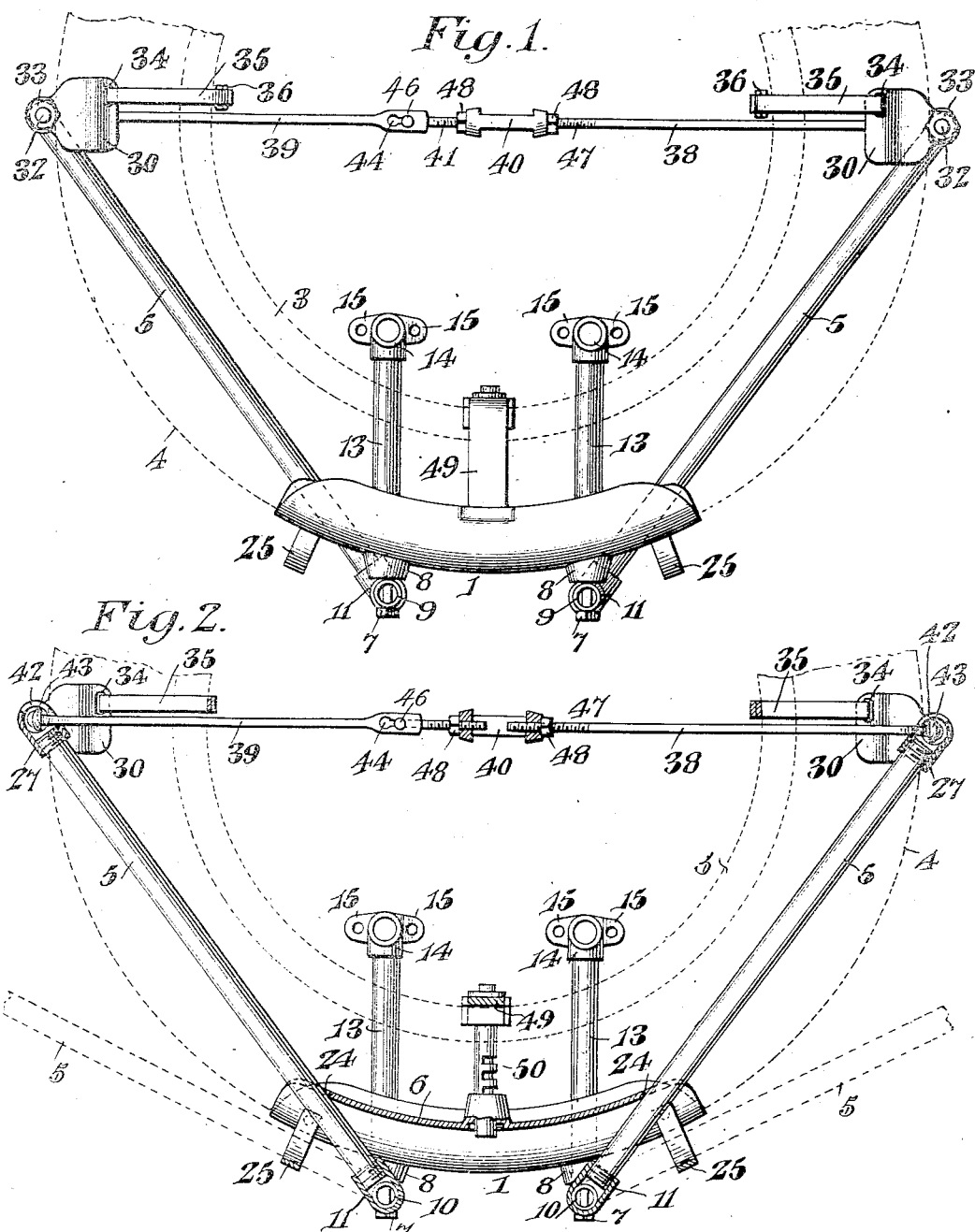

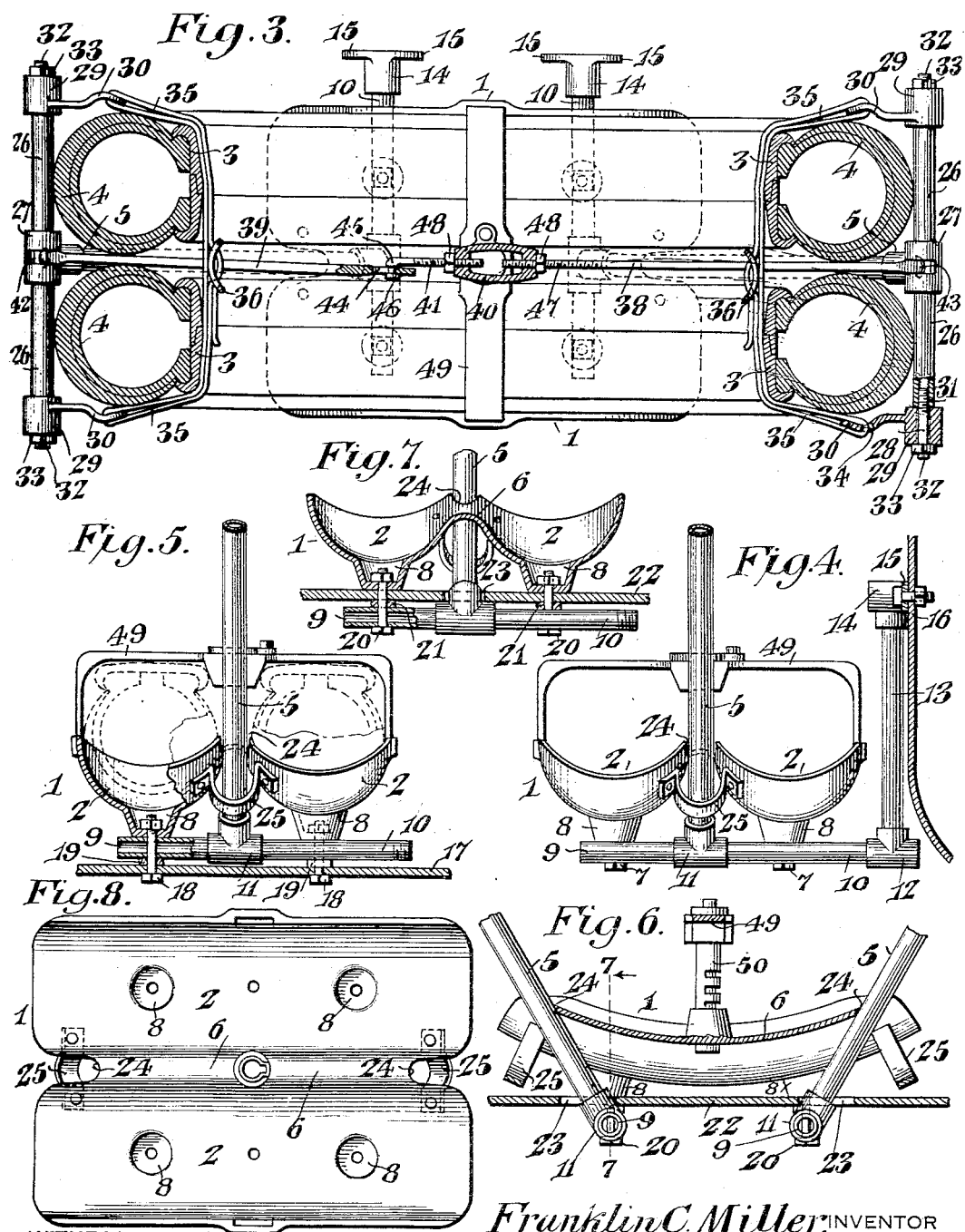

FRANKLIN COMFORT MILLER, OF EASTON, PENNSYLVANIA.

TIRE-HOLDER.

1,150,692.   Specification of Letters Patent.   Patented Aug. 17, 1915.

Application filed March 28, 1914. Serial No. 828,030.

*To all whom it may concern:*

Be it known that I, FRANKLIN C. MILLER, a citizen of the United States, residing at Easton, in the county of Northampton and State of Pennsylvania, have invented a new and useful Tire-Holder, of which the following is a specification.

The invention relates to improvements in tire holders.

The object of the present invention is to improve the construction of tire holders and to provide a simple, practical, and efficient tire holder of strong and inexpensive construction, adapted to be readily applied to the running board, back or other portion of an automobile, and equipped with means for supporting side by side a plurality of demountable rims with various forms of tires, and also various kinds of tires without rims, and capable of holding the same perfectly rigid and of ready operation to confine or release the tires.

With these and other objects in view the invention consists in the construction and novel combination of parts hereinafter fully described, illustrated in the accompanying drawing, and pointed out in the claims hereto appended, it being understood that various changes in the form, proportion, size, and minor details of construction, within the scope of the claims, may be resorted to without departing from the spirit or sacrificing any of the advantages of the invention.

In the drawings: Figure 1 is a front elevation of a rim and tire holder constructed in accordance with this invention, and provided with means for mounting it on the back of an automobile. Fig. 2 is a central vertical longitudinal sectional view of the same. Fig. 3 is a plan view of the rim and tire holder, a pair of demountable rims and tires being shown in section. Fig. 4 is an end elevation partly in section, illustrating the manner of securing the rim and tire holder to the back of an automobile. Fig. 5 is a similar view illustrating the manner of mounting the rim and tire holder upon the running board of an automobile. Fig. 6 is a longitudinal sectional view of the lower portion of the rim and tire holder, showing the support or tray arranged above the running board and the tire engaging and supporting arms pivotally mounted beneath the running board. Fig. 7 is a transverse sectional view on the line 7—7 of Fig. 6. Fig. 8 is a plan view of the support or tray.

Like numerals of reference designate corresponding parts in all the figures of the drawings.

In the accompanying drawings, in which is illustrated the preferred embodiment of the invention, 1 designates a bottom support or tray of substantially the same construction as that shown, described, and claimed in my Patent No. 1,094,084, granted Apr. 21, 1914, and constructed of pressed metal or other suitable material and curved transversely to provide grooves 2 and to form seats for a pair of demountable rims 3 and tires 4, which are supported side by side in an upright position on the tire holder by upwardly diverging arms 5 of side supports. The bottom support or tray is curved longitudinally in a direction circumferential of the tires to present upper concave surfaces to the same, and the tire receiving grooves are spaced apart by an intermediate longitudinally disposed connecting web 6, approximately U-shaped in cross section, and spacing the sides 2 from each other and forming a central longitudinal rib. The tire holder is designed to be mounted on any portion of an automobile, and the support or tray is secured at spaced points by bolts 7 or other suitable fastening device arranged in pairs and piercing depressed portions 8 of the support or tray to arrange them beyond and out of contact with the tires. The bolts 7 also pierce spaced inner and outer transversely disposed rods or members 9 and 10, arranged in pairs and designed to be constructed either of solid or tubular metal, and threaded at their adjacent ends to receive interiorly threaded T-shaped couplings 11, which are rigidly secured to the lower ends of the arms 5. The inner and outer transverse rods or members, which brace and stiffen the tray and constitute pivots for the arms 5, permit the said supports to swing upwardly and inwardly to engage the tires, or downwardly and outwardly to release the tires. The inner transverse rods or members are extended beyond the plane of the tray or support and are threaded to receive couplings 12 for connecting the said inner rods or members to vertical supporting rods 13, equipped at their upper ends with couplings 14, which are provided with attaching flanges 15 adapted to be secured to the back of an automobile, as shown at 16 in Fig. 4 of the drawings. The transverse rods or members and the vertical supporting rods form brackets or hangers for mounting the bottom support or tray on the body or other portion of an automobile, and while these brackets or hangers are shown in the drawings, as being constructed of tubular metal and couplings, said brackets or hangers may be made of any other suitable material.

When it is desired to mount the rim and tire holder upon the running board 17 of an automobile, bolts 18 of sufficient length to pierce the depressed portions of the bottom support or tray, the transverse rods or members, and the running board, are employed, washers or blocks 19 being interposed between the running board and the transverse rods or members to support the central couplings 11 clear of the running board, to enable the upwardly extending arms 5 to swing freely in raising and lowering the same. Also, the bottom tray or support may be arranged directly upon the running board with the transverse rods or members beneath the same, as illustrated in Figs. 6 and 7 of the drawings. With this arrangement, elongated bolts 20 are employed, and spacing washers or blocks 21 are interposed between the lower face of the running board 22 and the transverse rods or members to space the central couplings from the lower face of the running board. The running board 22 is provided with slots 23, through which the upwardly extending tire engaging and supporting arms pass, and the inner and outer walls of the slots 23 may, if desired, be utilized as stops for limiting the upward and downward swinging movement of the said arms. By limiting the inward or upward swing of the side supports the tires are relieved of strain when the said side supports are connected to form a rigid tire supporting structure. When the bottom support or tray is secured directly to the transverse rods or members 9 and 10, the arms 5 are limited in their upward movement by the inner walls of terminal recesses 24 of the tray or support, and the downward movement of the said arms 5 is limited by straps or yokes 25 secured to the lower face of the support or tray and bowed downwardly, as clearly illustrated in Fig. 4 of the drawings. The terminal recesses 24 are formed in the central web portion 6 and the arms 5 are limited in their upward movement to prevent the rims and tires from wearing within the holder, and to enable the said arms, when connected by the means hereinafter described, to constitute rigid engaging and supporting members. The said arms are limited in their downward movement by straps or yokes to prevent the former from striking and damaging any portion of the automobile when they are permitted to swing downwardly to release the rims and tires.

The arms 5, which diverge upwardly, are equipped at their upper ends with laterally projecting horizontal arms 26, preferably constructed of tubular metal and projecting inwardly and outwardly from the upper ends of the arms 5, and secured to the upper terminals thereof by T-couplings 27. The laterally extending arms 26, which are adapted to fit against the tread portions of the tires, as clearly illustrated in Fig. 3 of the drawings, are provided at their outer terminals with pivots 28 upon which are mounted sleeves 29 provided with retaining flanges or jaws 30. The rods 28 have inner threaded terminals 31, which are screwed into the interiorly threaded outer ends of the horizontal arms 26. The outer terminals 32 of the rods 28 are threaded for the reception of locking nuts 33 adapted to engage the outer ends of the sleeves 28 to clamp the same against the adjacent terminals of the arms 26, whereby the retaining flanges or jaws are maintained in their engaging position. The lock nuts are also adapted to be loosened to permit the flanges 30 to be turned out of engagement with the tires. The upwardly diverging inclined arms 5 and the laterally extending horizontal arms 26 form approximately T-shaped side supports which coöperate with the bottom support for maintaining the rims and the tires in an upright position. The side flanges or jaws 30 are preferably provided with slots 34 for the attachment of straps 35, which extend through the rims and tires, as clearly illustrated in Fig. 3 of the drawings. The straps 35, which may or may not be employed, connect the front and rear flanges or jaws at each side of the holder, each strap being preferably doubled, as shown, and linked into the slots of the flanges or jaws. The straps, which are provided with suitable buckles 36, assist in firmly securing the rims and tires within the holder.

The hinged or pivoted side supports are adjustably and detachably connected with each other to maintain them rigidly in contact with the inner stops and to release the side supports and permit the same to swing downwardly against the outer stops. This connecting means, which is disposed longitudinally of the tire holder, and which passes between the rims and tires, consists of rods 38 and 39, connected at their outer ends with the side supports and adjustably and detachably connected at their inner ends by means of a turn buckle 40 and a screw 41. The outer ends of the rods 38 and 39 extend through slots 42 in the upper couplings 27, and are provided with heads 43 arranged within the couplings and being of a diameter greater than the width of the slots. The slots, which extend longitudinally of the holder, are of a length to permit a limited relative swinging movement of the rods and the side supports. The rods 38 and 39 are introduced into the slots of the couplings 27 before the parts are assembled, and while this construction affords means for securing the outer ends of the rods to the side supports, any other suitable connecting means may, of course, be employed. The inner end of the rod 39 is flattened and provided with a key hole slot 44, and the screw 41, which engages one end of the turn buckle, has its other terminal portion 45 bent laterally at right angles, and provided with a head 46 of a size to pass through the enlarged portion of the key hole slot. The laterally bent terminal portion 45 of the screw 41 is reduced adjacent to the head to form a neck, which is carried into the constricted portion of the key hole slot by the tightening of the adjustable connection between the said supports. The inner end 47 of the rod 38 is threaded to engage the other end of the turn buckle, which connects the rod 38 and the screw 41, and which is adapted to be rotated to place the connecting means of the side supports under the desired tension. The turn buckle is also adapted to be operated to loosen the parts sufficiently to enable the head of the screw to be disconnected from the key hole slot of the inner end of the rod 39. When the adjustable connecting means is placed under tension, the side supports are maintained in rigid relation with the bottom support.

The rod 38 and the screw 41 are equipped with lock nuts 48 which clamp the ends of the turn buckle and prevent any accidental loosening of the same through jar and vibration. The rims and tires are locked in the holder by means of a yoke 49, arching the bottom support and carrying a lock 50. The yoke and the lock are constructed as shown and described in a copending application filed July 25, 1913, Serial No. 781,237. No claim is made in the present application to the yoke and the locking means, as this forms the subject-matter of certain claims of the first-mentioned application.

What is claimed is:

1. A tire holder including a bottom support or tray adapted to receive and support a tire, and side supports pivotally mounted at the ends of the bottom support and arranged to swing upwardly and downwardly to and from the tire and each limited in its upward swing by the bottom support or tray to relieve the tire of pressure, and means carried by the said supports for engaging the tire at the tread thereof.

2. A tire holder including a bottom support or tray adapted to receive and support a tire, side supports pivotally mounted at the ends of the bottom support and arranged to swing upwardly and downwardly to and from the tire and provided at the top with means for engaging the tire at the tread thereof, said tire holder being provided with stops for limiting the upward swing of the side supports, and means for rigidly maintaining the side supports in contact with the said stops to provide a rigid tire holder without subjecting the tire to pressure.

3. A tire holder including a bottom support or tray adapted to receive and support a tire, side supports pivotally mounted at the ends of the bottom support or tray and extending upwardly therefrom and arranged to swing upwardly and downwardly to and from the tire and provided at the top with means for engaging the tire at the tread thereof, said tire holder being provided with inner stops for limiting the upward movement of the side supports to relieve the tire of pressure and having outer stops for limiting the downward swing of the side supports, and means for maintaining the side supports rigidly in contact with the inner stops.

4. A tire holder including a bottom tire support or tray adapted to receive a plurality of tires, and side supports pivotally mounted at the ends of the bottom support and extending upwardly therefrom and provided at the top with horizontally disposed arms having spaced means for engaging a plurality of tires and carried into and out of engaging position by the upward and downward swinging of the side supports, said side supports being limited in their upward swing by the tray to relieve the tires of pressure.

5. A tire holder including pivotally mounted side supports provided at the top with means for engaging a tire at the tread thereof and adapted to be carried into and out of engagement with the tire by the swinging movement of the said supports, inner stops for limiting the inward movement of the side supports to relieve the tire of pressure, and means for maintaining the side supports rigidly in contact with the inner stops, said side supports, when released, being adapted to drop out of engagement with the tire.

6. A tire holder including inclined side supports pivotally mounted at their lower ends and provided at their upper ends with means for engaging a tire at the tread thereof, and carried into and out of engagement with the tire by the upward and downward swinging movement of the side supports, inner stops for limiting the upward movement of the side supports to relieve the tire of pressure, outer stops for limiting the downward movement of the side supports, and means for maintaining the side supports rigidly in engagement with the inner stops.

7. A tire holder including a bottom support adapted to receive a tire, side supports pivotally mounted below the plane of the bottom support and arranged to swing to and from the said bottom support and provided with means for engaging a tire at the tread thereof, said bottom support being interposed between and forming a stop for limiting the inward movement of the side supports to relieve the tire from pressure, and means for maintaining the side supports rigidly in contact with the bottom support.

8. A tire holder including a bottom support having spaced seats arranged to receive a plurality of tires, said bottom support being provided between the seats with terminal recesses, and pivotally mounted side supports arranged to swing into and out of the recesses of the bottom support and provided with means for engaging the tires.

9. A tire holder including a lower support provided with spaced tire receiving sides and having an intermediate web or connecting portion, said bottom support being also provided in the ends of the connecting web with recesses, side supports pivotally mounted below the plane of the bottom support and arranged to swing into and out of the said recesses, and means for maintaining the side supports rigidly in contact with the bottom support.

10. A tire holder including a bottom support having spaced tire receiving sides, side supports having arms pivotally mounted below the plane of the bottom support and operating at the space between the side seats, said side supports being arranged to swing to and from the bottom support, and straps or yokes carried by the bottom support and extending across the space between the seats and arranged to limit the outward movement of the side supports.

11. A tire holder including pivotally mounted side supports each consisting of a central stem and laterally extending arms carried by the central stem and projecting in advance and in rear of the same to engage a pair of tires at the treads thereof, means carried by the laterally projecting arms at the outer terminals thereof for holding the tires against transverse movement, and means extending between the tires for connecting the side supports with each other.

12. A tire holder including pivotally mounted side supports arranged to swing upwardly and downwardly and each consisting of a central stem and laterally extending horizontal arms carried by the stems and projecting in advance and in rear of the stem to engage a pair of tires at the treads thereof, jaws or flanges pivotally mounted on the outer ends of the said arms and arranged to rotate in planes in parallelism with the tires to carry them into and out of engagement with the same, said jaws being adapted to hold the tires against downward or forward movement, and clamping means having a threaded engagement with the arms for locking the jaws rigid therewith.

13. A tire holder including pivotally mounted side supports adapted to engage a plurality of tires and arranged to swing inwardly and outwardly with respect to the treads of the tires, rods or members extending between the tires and connected at their outer ends to the side supports and extending inwardly therefrom between the tires, and means for detachably and adjustably connecting the inner terminals of the rods.

14. A tire holder including pivotally mounted side supports adapted to engage a plurality of tires and arranged to swing inwardly and outwardly with respect to the treads of the tires, longitudinally disposed rods or members connected at their outer ends to the side supports and arranged to extend between the tires, one of the rods or members being provided with a slot or opening having a constricted portion, a screw having a laterally extending terminal portion provided with a head for detachably engaging the said slot or opening, a turn buckle connecting the screw with the other rod or member, and locking means for engaging the turn buckle to prevent rotary movement thereof.

15. A tire holder including pivotally mounted approximately T-shaped side supports provided with slots, longitudinal rods adapted to be arranged between two tires and extending through the slots and having heads arranged interiorly of the said supports, and means for connecting the inner ends of the rods.

16. A tire holder including a bottom support having a plurality of tire receiving seats, spaced transversely disposed rods or members arranged beneath the bottom support and forming pivots, and side supports mounted on the said pivots and provided with means for engaging the tires at the treads thereof, said supports being adapted to swing upwardly and downwardly into and out of their engaging or supporting position.

17. A tire holder comprising a bottom support, spaced inner and outer rods or members arranged in pairs and secured to the bottom support, and side supports pivotally connected to the bottom support by the said rods or members and arranged to swing upwardly and downwardly into and out of contact with the same.

18. A tire holder comprising a bottom support, spaced inner and outer rods or members arranged in pairs and secured to the bottom support, side supports pivotally connected to the bottom support by the said rods or members, and arranged to swing upwardly and downwardly into and out of contact with the same, said inner rods or members being extended beyond the bottom support, and hanger rods connected with the extended portions of the inner rods or members and provided with attaching means for mounting the tire holder on an automobile.

19. A tire holder including side supports pivotally mounted at their lower ends and provided at their tops with laterally extending arms for engaging the treads of the tires and having side jaws or flanges for retaining the tires against transverse movement, means extending between the tires for connecting the side supports with each other, said jaws or flanges being provided with slots, and straps arranged to extend across the inner or base portions of the tires and mounted in the said slots.

In testimony, that I claim the foregoing as my own, I have hereto affixed my signature in the presence of two witnesses.

FRANKLIN COMFORT MILLER.

Witnesses:
J. RUSSELL BROWN,
RUSSELL D. WELCH.